United States Patent [19]

Houseman et al.

[11] 4,033,133
[45] July 5, 1977

[54] START UP SYSTEM FOR HYDROGEN GENERATOR USED WITH AN INTERNAL COMBUSTION ENGINE

[75] Inventors: John Houseman, Pasadena; Donald J. Cerini, Flintridge, both of Calif.

[73] Assignee: California Institute of Technology, Pasadena, Calif.

[22] Filed: Mar. 22, 1976

[21] Appl. No.: 668,783

[52] U.S. Cl. .............................. 60/606; 23/288 R; 48/61; 48/102 A; 48/103; 48/107; 48/117; 48/DIG. 8; 60/300; 123/3; 123/179 R; 123/DIG. 12; 423/650

[51] Int. Cl.² ......................................... F02B 33/44

[58] Field of Search ...... 48/61, 116, 117, 102–103, 48/107, DIG. 8, 197 R, 199 R, 212, 213; 123/3, 1 A, 179 R, DIG. 12; 60/300, 606; 23/281, 288 R; 252/373; 431/DIG. 68; 423/650

[56] References Cited
UNITED STATES PATENTS

| | | | |
|---|---|---|---|
| 2,803,295 | 8/1957 | Ambrose et al. | 48/103 |
| 2,897,073 | 7/1959 | Shipp | 48/103 |
| 3,635,200 | 1/1972 | Rundell et al. | 123/3 |
| 3,717,129 | 2/1973 | Fox | 123/1 A |
| 3,732,690 | 5/1973 | Meijer | 123/1 A |
| 3,908,606 | 9/1975 | Toyoda et al. | 123/3 |
| 3,911,675 | 10/1975 | Mondt | 60/300 |
| 3,954,423 | 5/1976 | Hamper et al. | 48/107 |
| 3,982,910 | 9/1976 | Houseman et al. | 48/61 |

Primary Examiner—Robert L. Lindsay, Jr.
Assistant Examiner—George C. Yeung
Attorney, Agent, or Firm—Frielich, Lindenberg

[57] ABSTRACT

A hydrogen generator provides hydrogen rich product gases which are mixed with the fuel being supplied to an internal combustion engine for the purpose of enabling a very lean mixture of that fuel to be used, whereby nitrous oxides emitted by the engine are minimized. The hydrogen generator contains a catalyst which must be heated to a pre-determined temperature before it can react properly. To simplify the process of heating up the catalyst at start-up time, either some of the energy produced by the engine such as engine exhaust gas, or electrical energy produced by the engine, or the engine exhaust gas may be used to heat up air which is then used to heat the catalyst.

9 Claims, 6 Drawing Figures

START UP SYSTEM FOR HYDROGEN GENERATOR USED WITH AN INTERNAL COMBUSTION ENGINE

ORIGIN OF THE INVENTION

The invention described herein was made in the performance of work under a NASA contract and is subject to the provisions of Section 305 of the NASA Act of 1958, Public Law 85–568 (72 Stat. 435; 42 USC 2457).

BACKGROUND OF THE INVENTION

This invention relates to internal combustion engines, and more particularly to a system for supplying fuel to the engine.

In an application Ser. No. 487,156 filed July 10, 1974, now U.S. Pat. No. 3,982,910, by these inventors, which is entitled Hydrogen Rich Gas Generator, there is described and claimed a generator for producing hydrogen rich gas from hydrocarbon fuels. The generator has a catalytic bed containing particles of a partial oxidation catalyst, such as nickel, or platinum or silver oxide. A hydrocarbon fuel is mixed with air and then injected into a chamber where the mixture is ignited using a means, such as a spark plug. The ignited mixture produces a flame and gases which flow through the catalytic bed to heat it up to a required operating temperature. As the catalytic bed heats up beyond 900° F, the flame gradually moves into the catalytic bed and when a steady state temperature of 1800° F is reached there is no visible flame present and the requirement for igniting the air and hydrocarbon fuel mixture is no longer necessary, since ignition is caused to occur by the hot catalytic bed.

The catalytic bed converts the air and fuel mixture passing therethrough into hydrogen rich product gases which are then collected and mixed with fuel and air which is then fed into the cylinders of the internal combustion engine.

A preferred catalyst is a nickel catalyst. However, the manufacturer of this catalyst recommends that the nickel not be exposed to temperatures above 2200° F. It was previously indicated that start up requires first igniting gases with a burner, which gases are passed through the catalytic bed until it is heated to its light-off temperature, (the temperature at which the reaction starts). To keep the combustion gas temperature down, a rich combustion mixture is used with the flame temperatures on the order of 3000° F (hence the possibility that some of the catalyst is heated to higher than the 2200° F maximum). The 3000° F corresponds to an air/fuel mass ratio of approximately 10. To produce a lower temperature combustion requires using a lower air/fuel ratio. However, it is not feasible to use air/fuel ratios below 10 as this results in soot formation. Soot deposition on a catalyst, in turn, results in catalyst deactivation and can also cause plugging of gas passages in the catalyst. Further, the temperature above 2300° F, causes a degradation of the catalyst active surface so that some capability is lost with each cold start of the generator.

When a sufficient amount of catalyst surface has been heated above the light off temperature (800°–1000° F range for a nickel catalyst), the air/fuel ratio must be changed from the cold start value of 10 to the operating value of 5.2. This procedure will then cause the transition from a luminous start-up flame to flameless operation within the catalyst bed. Switching the air/fuel ratio from 10 to 5.2 during start-up requires an appropriate control system which adds to the overall complexity and which reduces the overall reliability.

Accordingly, a start-up system which would avoid overheating the catalyst and the need for apparatus for changing the air/fuel ratio from a start-up value to an operating value would result in a less expensive catalytic converter, as well as one which avoids the possibility of damage or plugging of the catalytic converter bed.

OBJECTS AND SUMMARY OF THE INVENTION

It is an object of this invention to provide a catalytic converter start-up system which eliminates the need for a start-up burner as well as the need for changing the air/fuel ratio from one value used at start-up to another value used during regular operation.

It is another object of the present invention to provide a new and improved start-up system for a hydrogen fuel generator using a catalytic converter.

Yet another object of this invention is the provision of a start-up system for a hydrogen generator using a catalytic converter, which avoids the possibility of damaging the catalytic converter.

The foregoing and other objects of the invention are achieved in an arrangement wherein the engine with which the hydrogen generator is associated is initially started in its usual manner. Energy generated by the engine is used to heat up the catalytic bed. The engine produces exhaust gas which is sufficiently hot so that it can be either applied directly to the catalytic bed of the hydrogen generator to rapidly heat it to the required start-off temperature, at which point the exhaust gas is no longer used, or the exhaust gas may be used to preheat air which is then applied to the catalytic bed to cause its temperature to rise to the start-off temperature. At that time the air can be turned off. Another catalytic converter preheat system in accordance with this invention is to imbed electrical heater wires in the catalytic bed and apply electrical current to the wires until the bed reaches the required temperature.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
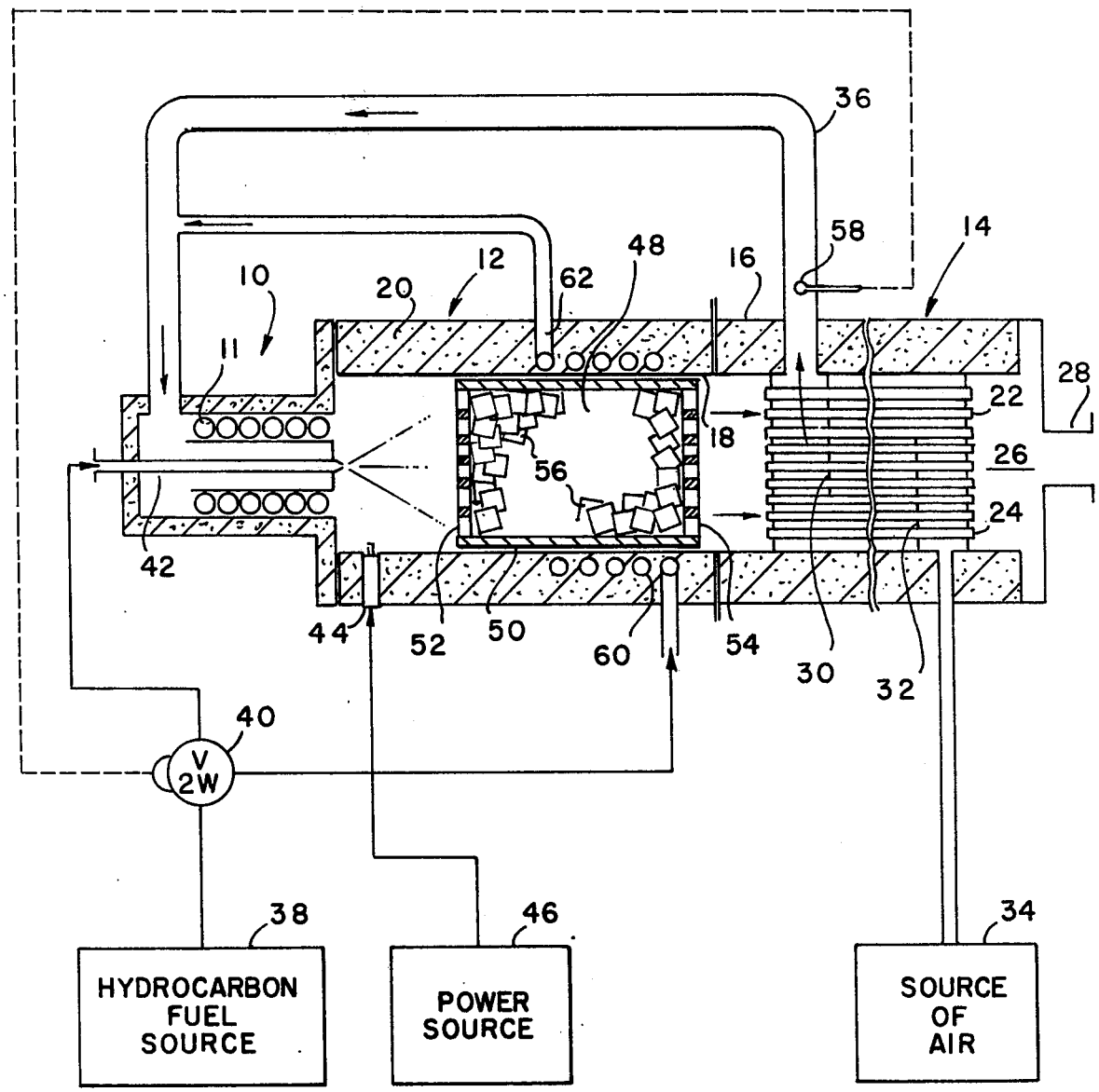
FIG. 1 is a schematic cross-sectional view of a hydrogen generator as described and shown in application Ser. No. 487,156 filed July 10, 1974, now U.S. Pat. No. 3,982,910, by these inventors.

FIG. 1 is a schematic drawing of a hydrogen generator using a catalytic converter and is identical with FIG. 10 in the previously mentioned application Ser. No. 487,156. It is shown for the purpose of assisting in providing a better understanding and appreciation of this invention. The hydrogen generator basically comprises three sections, a mixer section 10, a combustion section 12, and a preheater or heat exchange section 14. The combustion section and heat exchange section together effectively constitutes a hollow cylinder having an outer wall 16 and an inner wall 18 spaced therefrom. Suitable insulation 20, such as cast ceramic, is positioned therebetween. The heat exchanging section includes a plurality of hollow tubes, 22, 24, for example, which are spaced from one another and which extend from the combustion section to a collection space 26, leading to the exhaust flange 28.

A plurality of baffles, 30, 32, which are spaced from one another, extend from the opposite sides of the inner walls in a manner so that the air, which is introduced from a source of air 34, will follow a zig zag path through the space between the tubes until the air reaches an air exit passage 36, which is positioned at the opposite end from the air entrance was to the heat exchange region. In this manner the air comes in contact with the tubes through which hot hydrogen rich gases pass. The baffles 30, 32, provide for cross-flow of the air across these tubes and thus effectuate an effective heat transfer.

The air leaves the exit flange 36 and is directed into the mixer section 10. The air circulates around a nozzle 42 and passes through spiral tubes 11 into the combustion section 12. At start-up, a liquid hydrocarbon fuel from a source 38, is pumped through a two-way valve 40, into the mixer section. The mixer section has the start-up nozzle 42, which emits a spray of liquid droplets into the combustion chamber in combustion section 12. The air/fuel mixture in the combustion chamber is ignited by a spark plug 44, which is powered from a source 46. A partial oxidation reaction then occurs. A catalytic bed 48 is placed adjacent to the region where combustion takes place during start-up. This bed comprises a cylinder 50 which has a perforated top wall 52 and a perforated bottom wall 54, to permit hot gases to flow from the combustion region through the catalytic bed into the heat exchange section 14. The catalytic bed contains particles 56, of a partial oxidation catalyst such as nickel, deposited in a substrate such as aluminum pellets which serve to speed up the partial oxidation reaction of the hydrogen carbon with air, to yield a hydrogen rich gas. Other partial oxidation catalysts, such as palladium, platinum or silver oxide may also be used for the reaction of hydrocarbon and air.

During start-up, the air/fuel ratio sprayed into the combustion chamber is maintained above the vaporized fuel normal design value, such as 10. There is a temperature sensor 58, in the air exit flange, and when this sensor detects the fact that a preset temperature value has been exceeded by the preheated air, it controls the two-way valve 40 to prevent further application of fuel to the start-up nozzle in the burner and instead supplies the fuel to a fuel vaporization coil 60. Changes in the amount of fuel delivered to the burner and to the vaporizer are determined by the sizes of the two way valve exit parts. The coil 64 is wound on the inner metal combustion shell or the inner wall 18 and is embedded in the insulation 20.

The vaporized fuel leaves the coil exit 62, and thereafter is mixed with the heated air stream coming out of the air exit flange 36. The pre-mixed vaporized fuel/air stream now passes through the mixer section 10 through the spiral tube 11, into the combustion chamber, where partial oxidation of the fuel takes place to produce a hydrogen rich gas. It should be noted that when the two-way valve 40 is switched to the vaporized fuel position, the air/fuel ratio is reduced to an operating value on the order of 5.2. While air temperature may be used to determine the proper time for operating the two-way valve so that the air/fuel mixture value is changed to the operating value, it is also possible to sense the catalytic temperature and when this reaches a predetermined value, the valve 40 may be operated to the run mode, from the start-up mode.

In accordance with this invention, the construction of the catalytic converter is considerably simplified. Other and better means are provided for bringing the catalytic bed to its start-up temperature. The embodiments of the invention which are described subsequently herein include an aircraft piston type internal combustion engine. However this should not be construed as a limitation on the invention, since those skilled in the art will readily understand how the invention may include any other type of internal combustion engine.

Figure 2:
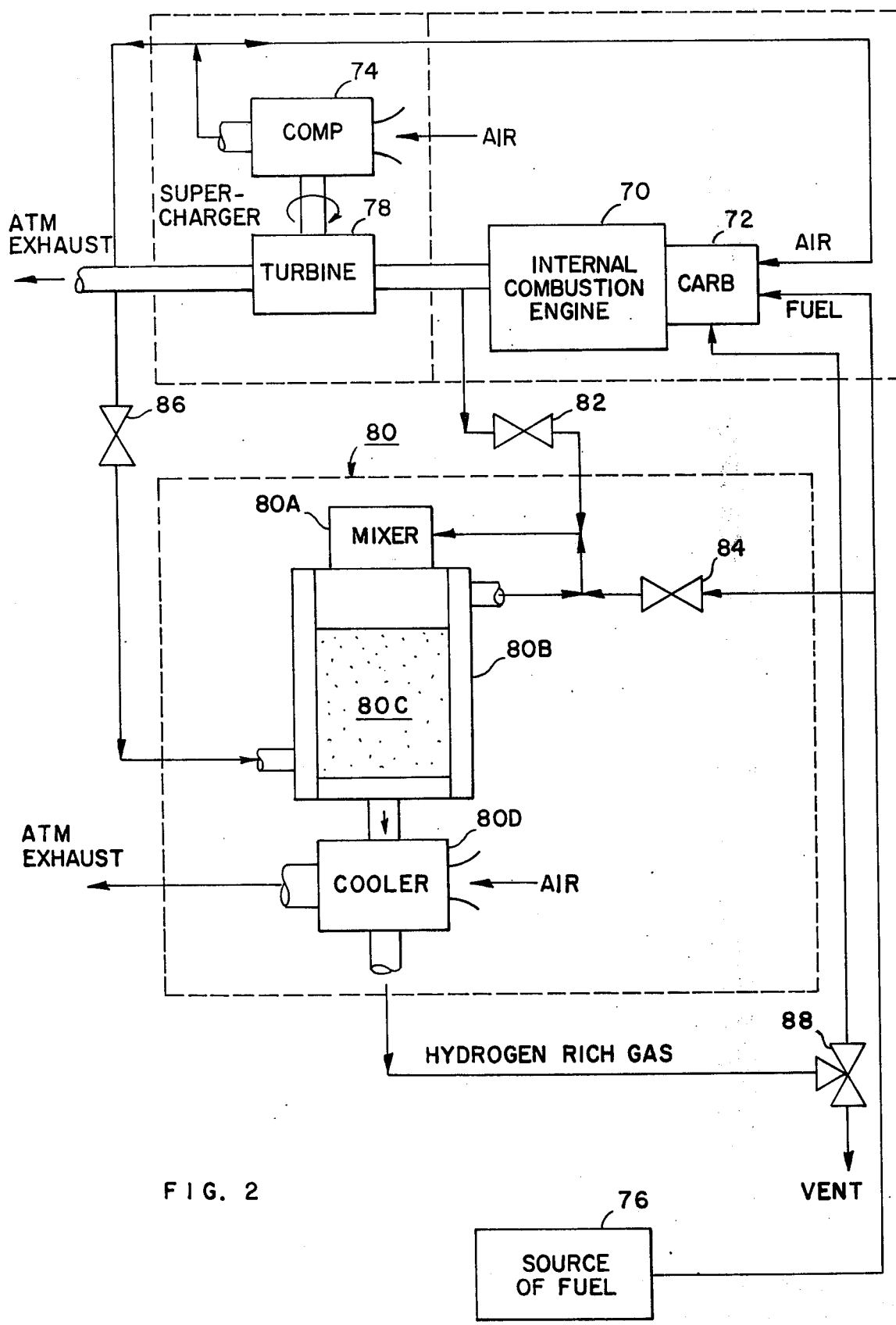
FIG. 2 is a schematic drawing illustrating one embodiment of this invention.

Referring now to FIG. 2, there may be seen a schematic diagram of an arrangement in accordance with this invention. An internal combustion engine, 70, has a carburetor 72, to which air is supplied from an air compressor 74, and fuel is supplied from a source of fuel 76. The compressor 74 may be driven by a separate electric motor, or may be driven by a turbine 78 which in turn is driven by exhaust gases from the internal combustion engine.

The hydrogen generator is included in the dotted rectangle indicated by reference numeral 80. It includes a mixer section 80A, a combustion section 80B, having a catalytic bed 80C and a cooling section 80D. The combustion chamber as shown in FIG. 1 may be omitted since it is not needed.

The engine is started in its usual manner, without mixing any hydrogen rich gas with the incoming fuel. A valve 82 is opened to permit some of the exhaust gas from the internal combustion engine to enter into the hydrogen generator by way of the mixer region 80A. A fuel valve 84, at this time, is closed, and an air valve 86, at this time, is also closed. A two-way valve 88, in one position vents the hydrogen gas generator, and in another position permits the hydrogen rich gas to be supplied to the carburetor of the internal combustion engine. The fraction of the hot engine exhaust gas which enters the mixer 80A, by way of valve 82, has a temperature on the order of between 1000° to 1200° F and heats up the catalytic bed quickly. The engine exhaust gas, which passes through the hydrogen generator at this time, is vented to the atmosphere through valve 88. When the catalytic bed has reached the temperature at which light-off occurs (approximately 900° F) the valve 82 is closed, and valve 86 is opened to permit a fraction of the air from the engine super charger to enter a heating jacket surrounding the catalytic bed of the hydrogen generator. The jacket heats the air received to a temperature, slightly higher than the ambient, which for steady state conditions is approximately 400° F. Fuel valve 84 is opened and valve 88 is operated at this time to the position which permits gas exiting from the generator to enter the carburetor of the engine. The fuel valve 84 is also opened at this time and the rate of fuel entering the mixer 80A is slowly increased. The fuel is completely vaporized in the mixer by the heated air. The vaporizer fuel/air mixture entering the catalytic bed 80C will start to react with the catalyst and the subsequent temperature in the bed will reach a steady state at approximately 1800° F.

The exiting hydrogen-rich product gas passes through the supplementary air cooled product-gas cooler 80D and exits the hydrogen generator at approximately 500° F or below. It is fed to the engine carburetor through the valve 88.

By way of example, a carburetor suitable for use for enabling engine start-up and for thereafter mixing the hydrogen rich product gas with the fuel and air in the proper proportions is shown and described in a patent by J. Rupe U.S. Pat. No. 3,906,913.

Figure 3:
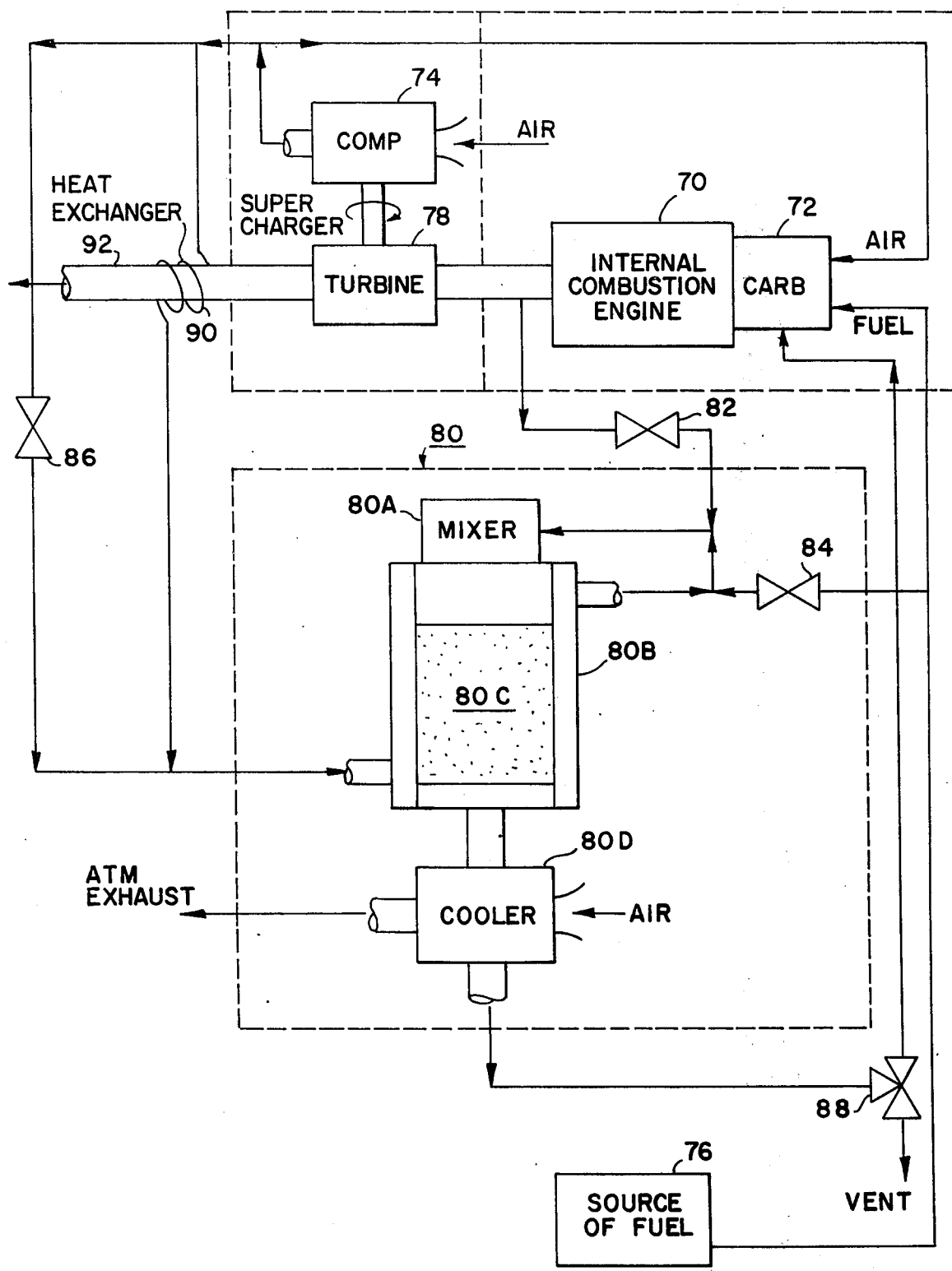
FIG. 3 is a schematic drawing illustrating another embodiment of this invention.

FIG. 3 shows another arrangement for heating the catalytic bed, using a heat exchanger which extracts heat from the engine exhaust gas. Apparatus which serves the same function as the apparatus shown in FIG. 2 has the same reference numerals applied thereto. During start-up, valves 84 and 86 are closed and valve 88 is set to its venting position. Some of the air from the compressor 74 passes through a heat exchanger, which may comprise pipe coils 90, wrapped around the exhaust pipe 92 through which the hot combustion gas exhausted from the internal combustion engine passes. The air passing through the wrap around pipes 90, comprising the heat exchanger, is delivered to the hydrogen generator heating jacket and exits from the heating jacket into the mixer 10, as previously described. The air is at a temperature between 900°–1000° F when it reaches the heating jacket. When the catalytic bed reaches the light-off temperature, valve 84 is opened to permit fuel to be added to the hot air, and the vaporized fuel/air mixture then starts to react on the catalytic bed. At that time, valve 86 is opened so that air from the compressor will bypass the heat exchanger and enter into the heating jacket of the catalyst to be heated by the catalyst. The air coming out of the heating jacket is then mixed with the incoming fuel. The air has a temperature on the order of 400° F, while the temperature of the catalytic bed rises to 1800° F.

The primary difference between the embodiments of the invention shown in FIGS. 2 and 3 is that in FIG. 2, a catalytic bed is preheated with hot air rather than with combustion gas as in FIG. 2. Exposure to air results in adsorption of oxygen in the catalyst which results in a somewhat lower light-off temperature compared to heating up with combustion gas. The advantage of a lower light-off temperature can be balanced against the extra heat exchanger requirement.

When it is desired to turn off the engine and the catalytic converter, it is desirable to purge the catalytic converter. While this may be done by turning off fuel valve 84 and turning valve 88 to its venting position, it is more desirable to purge the catalytic bed with air having a reduced oxygen content. This can be done by opening valve 82, which admits exhaust gas to the mixer 80A.

The valves shown in FIGS. 2 and 3 can be operated between their open and closed positions either manually, by observing on a suitable indicator (not shown) the temperature of the catalytic bed. When it reaches the light off temperature, valve 82 is turned from its open to its closed position and valves 84 and 86 are opened from their closed positions. Valve 88 is operated from the vent position to the position at which it feeds back hydrogen rich product gas to the carburetor. Alternatively, a sensing device in the catalytic bed can be used to control the valves, which may be solenoid actuated, so that they can be electrically operated between their closed and opened positions. The technique for controlling solenoid operated valves from a temperature sensing device is well-known and need not be shown here.

Figure 4:
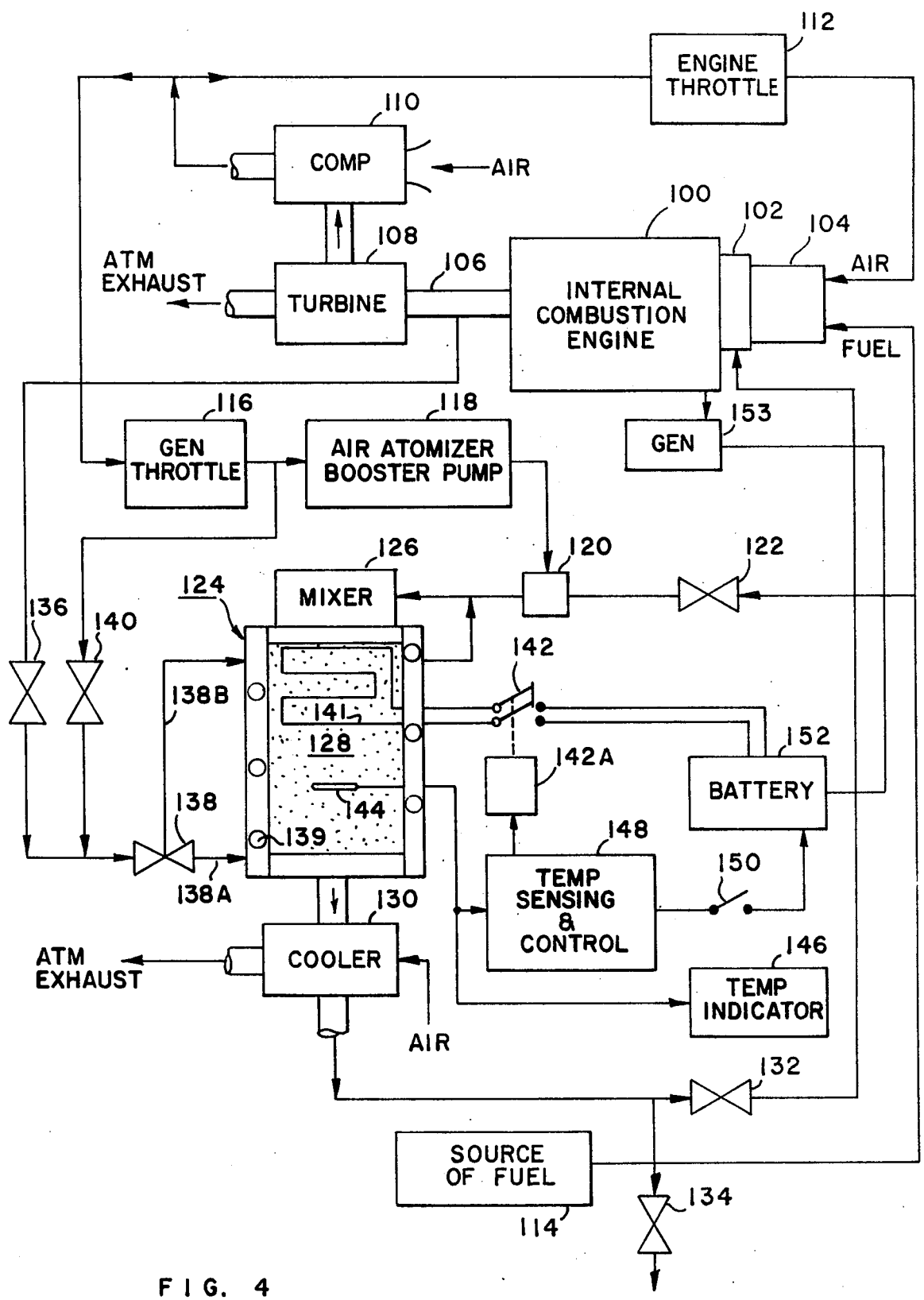
FIG. 4 is a schematic drawing illustrating still another embodiment of this invention.

Referring now to FIG. 4, there may be seen a schematic diagram of another embodiment of the invention. The systems shown can either use exhaust gases alone for preheating the catalytic bed, or a system using electrical heating wires in the bed for preheating, or a combination of both if desired.

Schematically represented in FIG. 4 is an internal combustion engine 100, having a manifold 102 for distributing a fuel/air mixture to the engine cylinder and a carburetor 104. The engine exhaust gases are guided through a tube 106 to a gas turbine 108, which drives an air compressor 110. Also represented is the engine throttle 112. Fuel, from a source 114 is fed to the carburetor of the engine, and air from the air compressor 110, is fed through the engine throttle into the carburetor to be mixed with the fuel.

Air from the compressor is also fed to another throttle 116, called the generator throttle. This controls the amount of air that is fed to an air atomizer booster pump 118 and to a generator main air supply valve 140. The air output from the booster pump is fed to a fuel atomizer 120. The fuel atomizer 120 will receive fuel from a source of fuel 114 when a valve 122 is open. Heated air which has circulated around the hydrogen generator, together with the atomized fuel are fed to the mixer 126 where the heated air causes the atomized fuel to be vaporized. The mixture of vaporized fuel and air is fed from the mixer 126 to the catalytic bed 128, where the reaction converting the incoming air fuel mixture into a hydrogen rich product gas, takes place. The output from the hydrogen generator is then passed through an air cooled cooler 130. The hydrogen rich product gas which passes through the cooler back is then fed to the engine manifold 102, through a valve 132, when this valve is open. The output of the hydrogen generator can be fed to the exhaust when an atmospheric exhaust valve 134 is opened and valve 132 is closed.

For preheating the catalytic bed, exhaust gas from the engine is fed through a valve 136, to a second three-way valve 138. The three-way valve has two positions, one position opens a passageway, designated by 138A, which leads to a spiral passageway 139 circulating around the catalytic bed. The second position closes passageway 138A and opens a passageway 138B which leads to the top of the container holding the catalytic bed. When the valve 138 is in the position 138A, exhaust gas is permitted to flow through the spiral passageway 139 then into the mixer 126. In this way the hot engine exhaust gas heats the bed up to the operating temperature. The exhaust gas passes then through the bed, through the cooler and then out through valve 134 to the atmosphere.

The air output of the generator throttle valve 116 is also fed into the valve 138 through a valve 140, when it is opened. Valve 136 is closed and valve 140 is opened, when the catalytic bed reaches its operating temperature. The air passing through valve 140 also passes through valve 138 and around the spiral passageway so that this air is preheated. This is the air that is then delivered to the mixer.

Upon shutdown of the hydrogen generator, it is desirable to purge the generator of hydrogen rich gas and cool the catalyst quickly. Purging with clean air, should be avoided, and it can result in overheating the catalyst by too rapid oxidation of the catalytic agent (nickel or platinum). In accordance with this invention, when purging is desired, just before engine shutdown, the valve 140 which admits air from the compressor is closed, and the valve 136 is opened. Valve 138 is turned to the position feeding passageway 138B. As a result inert exhaust gas is passed directly through the catalytic bed, bringing its temperature down from the operating temperature to the exhaust gas temperature. As a result, the engine exhaust gases can serve as both a start-up heating and inert cool down media.

An alternative system to preheating with exhaust gas is to embed electrical heating wires, such as nichrome wire coils 140, in the upstream ⅓ of the catalytic bed. Application of power on the order of 1 kilowatt to the heating wires can heat enough of the catalyst above the minimum temperature of 800° F in 20–30 seconds to sustain the reaction at the running air/fuel ratio of 5.2. The heaing wires 140 are connected to a solenoid operated switch 142. The solenoid is represented by 142A. A battery 152 applies power through the switch 142, when closed, to the heating wires 140. The battery is charged in well known fashion by a generator 153 which is driven by the engine. A temperature sensor 144, which is also embedded in the catalytic bed, is connected to both the temperature indicator 146 and to a temperature sensing and control circuit 148. A manually operated switch 150 is used to activate the temperature sensing and control circuit by connecting it to a source of power such as a battery 152. The temperature sensing and control circuit then energizes the solenoid 142A whereupon switches 142 are closed. As a result, power is supplied to the heating wires 140. When the catalytic bed 128 has reached the temperature required to sustain the reaction, the temperature sensor 144 actuates the temperature sensing and control circuit to deactivate the solenoid 142A whereby the switch 142 is open. The temperature is also indicated on a temperature indicator 146. At this time the switch 150 may be opened so that when the engine is shutdown the drop in temperature of the catalytic bed will not cause the temperature sensing control circuit to operate the solenoid 142A again. The temperature sensor may be any known device which such as a thyristor whose resistance changes with temperature. This can cause a predetermined voltage drop thereacross or current flow therethrough to de-energize a relay in the temperature sensing and control device which is energized when switch 150 is closed.

In order to reduce the electrical power and time required to reach start-up temperature, and also in order to reduce the impedance to air flow through the catalytic bed, instead of using a pellet type catalyst, a monolithic type catalyst is preferred. The monolithic type catalyst is a honeycomb or porous structure. The power and time required to reach start-up temperature of the monolithic type catalyst is reduced by as much as 50% over the pellet type catalyst, because of the reduced mass required per unit of exposed catalytic surface.

The following table shows the settings for the various valves during each of the preheating modes which are possible of the arrangements shown in FIG. 4. These include the start-up of the generator using both the electrical and exhaust preheating mode, generator start-up using the exhaust mode. The settings of the valves when the generator reaches steady state operation is also shown. These then follows a showing of the setting of the valves for normal shut-down and for emergency shut-down. Then there is a listing of the components whose operation is shown in the chart followed by an explanation of the symbols which are used.

GENERATOR OPERATING SEQUENCE

| MODE | | 136 | 140 | 138 | 122 | 134 | 136 | 118 | 142A |
|---|---|---|---|---|---|---|---|---|---|
| ENGINE START & TAKE-OFF | | C | C | P | C | C | O | DE | DE |
| GENERATOR STARTUP (ELECT.+EXH.) | a) | O | C | | C | C | O | DE | DE |
|  | b) | C | C | | C | C | O | DE | E |
|  | c) | C | O | | O | O | C | E | DE |
| GENERATOR STARTUP (ELECT.) | a) | C | O | | O | O | C | E | E |
|  | b) | C | O | | O | O | C | E | DE |
| GENERATOR STARTUP (EXH.) | a) | O | O | | O | O | C | E | DE |
|  | b) | C | O | ↓ | O | O | C | E | DE |
| STEADY STATE | | C | O | B | O | O | C | E | DE |
| SHUTDOWN (NORMAL) | a) | C | C | P | C | C | O | DE | DE |
|  | b) | O | C | P | C | C | O | DE | DE |
|  | c) | C | C | P | C | C | O | DE | DE |
| SHUTDOWN (EMERGENCY) | | C | O | P | C | C | O | DE | DE |

COMPONENTS:
SHUTOFF VALVES, AIR, 138,140 EXHAUST, 136, FUEL 122
PRODUCT 134,136
THREE WAY VALVE 138.
FUEL ATOMIZER AIR PUMP 118
HEATER SOLENOID 142A

SYMBOLS:
C — CLOSED        P — PREHEAT        DE — DE-ENERGIZED
O — OPEN          B — BYPASS         E — ENERGIZED

It will be noted that the engine start and take off occurs first, thereafter there is a 3-step generator start-up process when a combined electrical and exhaust preheat process is used. A 2-step start-up is needed only when the electrical process is used. A 2-step start-up is needed also only when the exhaust process is used. A 3-step normal shutdown process is used also. As indicated previously, the valves can be solenoid operated and their opening and closing can be actuated either manually or by automatic sequencing in response to a stepper switch or electronic counter that is actuated either in response to catalytic bed temperature or time delay, or a combination of both.

Figure 5:
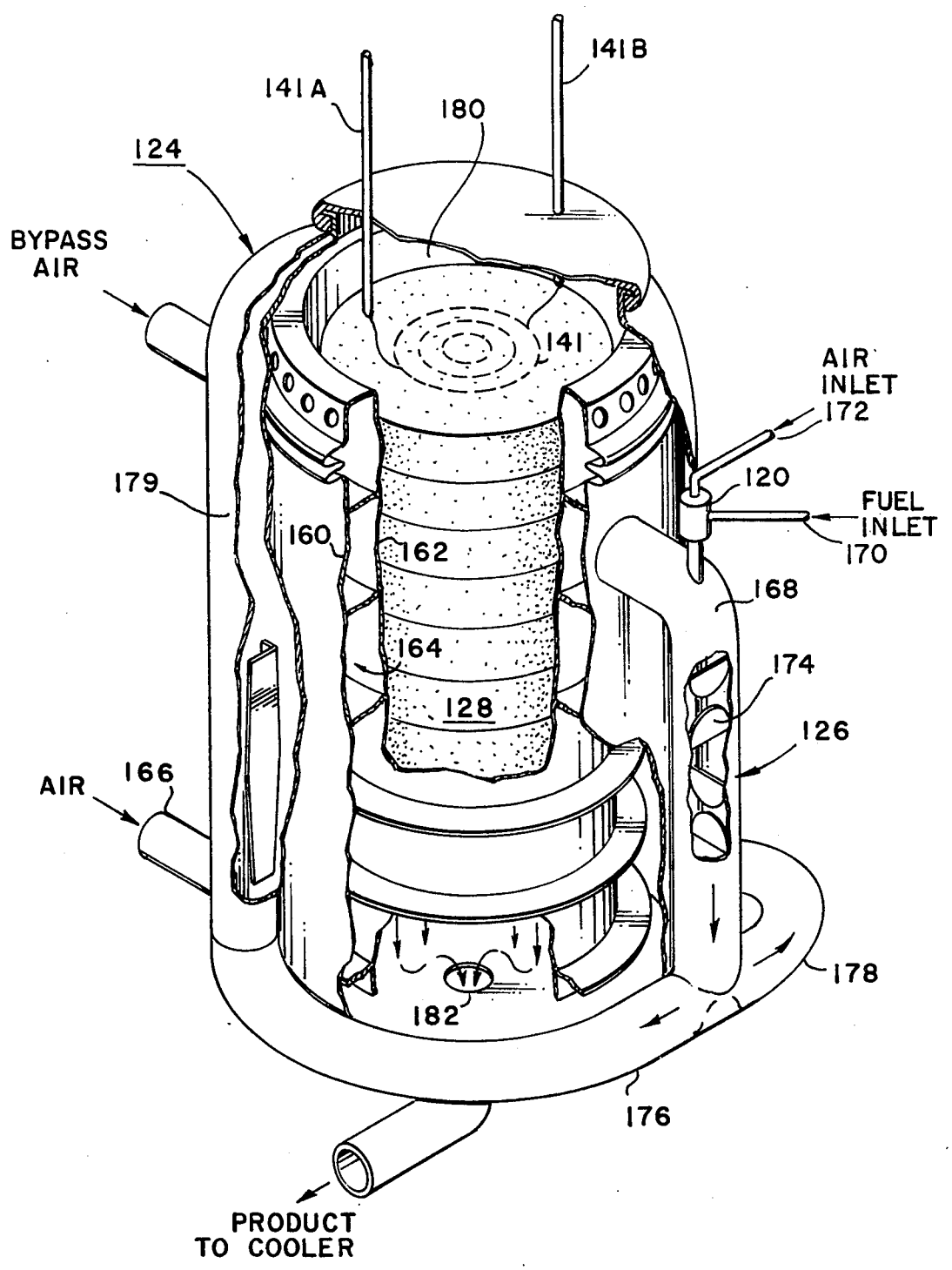
FIG. 5 is a pictorial drawing of a hydrogen generator suitable for use with the catalytic bed heating systems described.

FIG. 5 is a drawing, in perspective and partially cut away, of a hydrogen generator, in accordance with this invention. The parts of the generator which are similar to the parts represented in FIG. 4 bear the same reference numerals. The electrical heating wires 140 are connected to two input terminals respectively 140A, 140B. The top end of the chamber 124 is the input to the bed and the bottom end is the output 124. The container includes an inner pair of walls respectively 160, 162, with the catalytic bed 128 being adjacent to the walls 162. A spiral passageway 164, is established between the pair of walls, and incoming air exhaust gases are directed from an inlet port 166 to the bottom of the spiral passageway. It will flow upwardly along the catalytic bed, and will then flow out into a pipe which is part of the mixer 126.

At the top of this pipe is the fuel atomizer 120 with the two incoming pipes respectively 170, 172, serving as fuel inlet and air inlet pipes. The mixer pipes contains a plurality of baffles 174, which are disposed in a manner to insure a through mixing of the air received from the spiral passageway 164 with the atomized fuel to insure vaporization of the atomized fuel. The air/fuel mixture then flows into two branching pipes respectively 176, 178, which lead into the passageway defined between the wall 160 and an outer wall 179, which surrounds the entire generator, thus, insuring uniform flow to the catalytic bed. The passageway between the walls leads into the input end or top end 180 of the chamber 124 which adjacent the leading side of the catalytic bed. The air/fuel mixture then passes through the catalytic bed and then not through an exit port 182, to the cooler portion of the hydrogen generator, which is not shown here.

Figure 6:
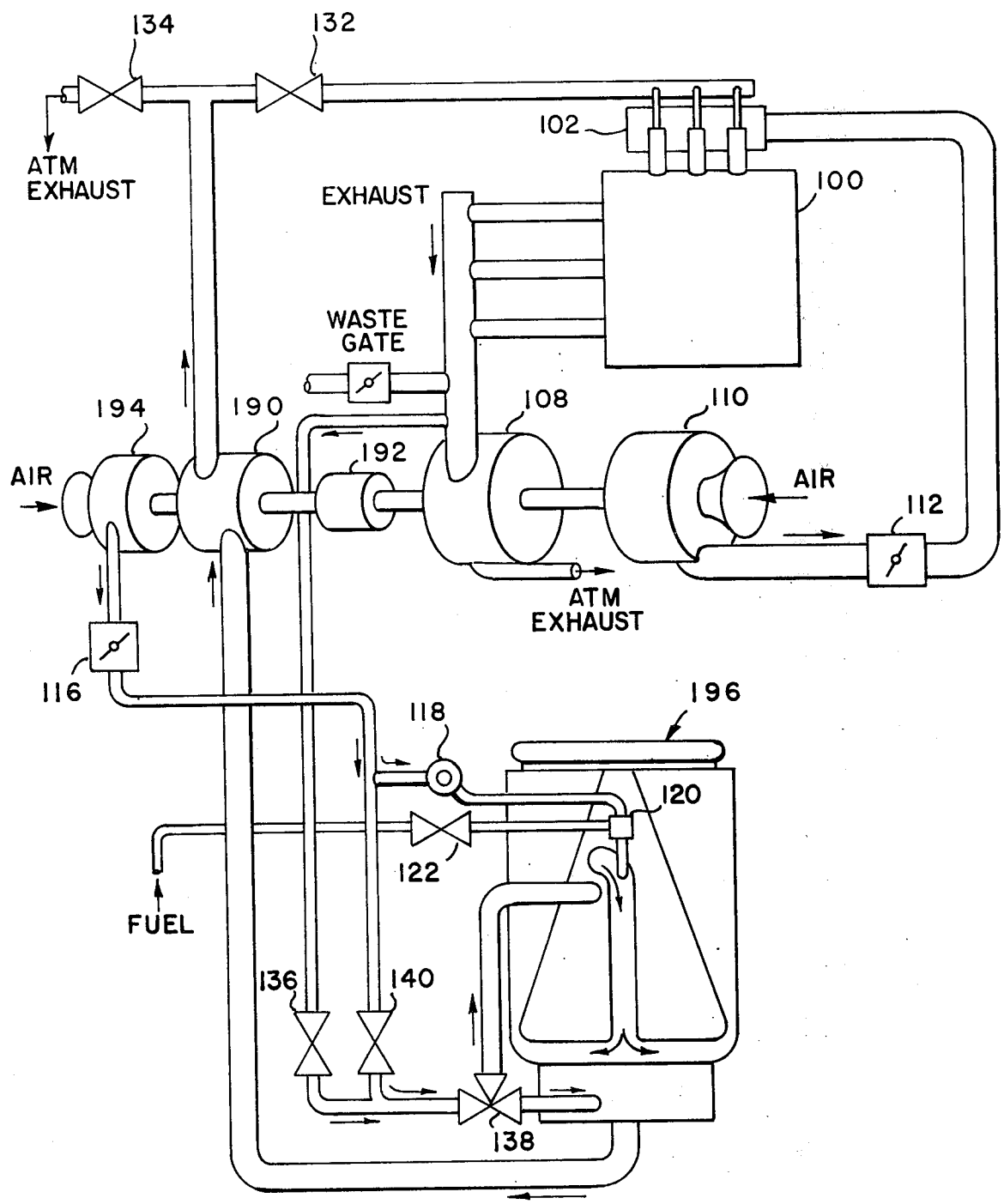
FIG. 6 is a schematic drawing of an improvement over FIG. 4.

FIG. 6 is a schematic pictorialized drawing of a preferred embodiment of the invention. It comprises a modification of the arrangement represented by FIG. 4, or one of the preceding drawing figures, and therefore structure having similar fuctions to the structures shown in FIG. 4 will bear the same reference numerals.

The modification comprises the addition of a small turbine 190, which upon engine startup, is driven through an overriding clutch 192 by the turbine 108 driven by the engine exhaust gas. The turbine 190 drives an air compressor 194 whose sole function is to provide air for the hydrogen generator 196 and for driving the air atomizer booster pump.

The hydrogen generator outpt is first fed to the turbine 190 and after passing therethrough, is applied to the atmospheric exhaust valve 134 and to the valve determining feed of hydrogen product gas to the engine. When the hydrogen product gas becomes hot enough to power the turbine 190, the turbine is driven by the hydrogen generator output and the drive from the turbine 108 is effectively disconnected.

In the case of engines which do not have turbines, the override clutch 192 may be driven directly from the engine.

The advantages of the addition of a small turbine driven air compressor as shown in FIG. 6 are that it improves engine generator efficiency by eliminating the requirement for an engine driven air pump to supply air to the hydrogen generator at 10 psig, where there is not supercharger for the engine, and in those cases where there is a supercharger, it eliminates the requirement for pumping the total air flow to a higher pressure, as required by the generator, whereas engine pressure requirements are significantly less.

It enables an increase in the generator system operating pressure level from 17 to 50 psia, which permits a reduction in generator size as a result of increased reactant density, and improves catalyst activity which is a fuction of operating pressure level. It also increases the generator system efficiency by turbo-charger utilization of 37% of the sensible heat in the generator product normally transferred to the engine cooling system by means of the product heat exchanger. Thereby, a reduction in the size of coolant pumping power requirements for the hydrogen generator product system is provided.

While the description of the embodiments of the invention are in connection with supercharged engines, i.e. those using turbine driven air compressors, this not to be construed as a limitation on the invention since it is believed to be obvious to those skilled in the art how this invention can be used with and for internal combustion engines not having turbine driven air compressors.

There has accordingly been shown and described herein a novel and useful system for startup heating the catalytic bed of a hydrogen generator from heating energy developed by an internal combustion engine.

We claim:

1. In combination, an internal combustion engine, which produces hot exhaust gas when operative, and a hydrogen product gas generator,
    said internal combustion engine having means for applying an air/fuel mixture to said engine, and means attached to the engine for producing air under pressure,
    said hydrogen product gas generator including
    first walls defining a hollow chamber, said chamber having an input end, an output end, and a center portion,
    a catalytic bed positioned in said center portion,
    second walls forming a spiral passageway around said first walls, said spiral passageway having an input end and an output end,
    fuel atomizer means having a fuel input, an atomizing air input, a vaporizing air input and output,
    air/fuel mixer means having a first input connected to said fuel atomizer output, a second input adjacent sid first input connected to said spiral passageway output end, and an output connecting to said hollow chamber input end,
    first valve means having one position for permitting hot exhaust gas to be applied from said engine to said spiral passageway input end to thereby heat the enclosed catalytic bed to an operating temperature, and a second position for blocking further gas application,
    means defining a source of liquid hydrocarbon fuel, second valve means having one position for applying fuel from said source to said fuel atomizer means fuel input and a second position for blocking said fuel input, means for applying air from said means attached to the engine to said fuel atomizer means atomizing air input for atomizing fuel applied to said fuel atomizer means, third valve means having a first position for applying air from said means attached to the engine to said spiral passageway input end and a second position for terminating the application of air, and fourth valve means having a first position for connecting said hollow chamber output end to said means for applying an air/fuel mixture to said engine, and a second position for venting the hollow chamber output to the atmosphere whereby following engine start up, said first valve means is placed in its first position, said second, third and fourth valve means are placed in their second positions, thereby hot engine exhaust gas can heat said catalytic bed up to its operating temperature and then be exhausted to the atmosphere, and upon the catalytic bed reaching its operating temperature, said first valve means is placed in its second position and said second, third and fourth valve means are placed in their first positions whereby vaporized hydrocarbon fuel and air are applied to said catalytic bed to produce a hydrogen rich product gas which is applied to said engine.

2. In the combination recited in claim 1 wherein said means for applying an air/fuel mixture said engine includes an intake manifold, and said fourth valve means, when in its first position connects said hollow chamber output end to said intake manifold.

3. In the combination recited in claim 1 wherein said catalytic bed is a monolithic catalytic bed.

4. In the combination recited in claim 1 wherein said means for producing air under pressure by said engine comprises gas driven turbine means including means for driving said turbine from said engine until it is gas driven, means for connecting said gas driven turbine means between said hollow chamber output end and said fourth valve means for driving said gas driven turbine means with the gas output from said hydrogen generator and thereafter applying the gas output which has driven said turbine means to said fourth valve means, air compressor means driven by said gas driven turbine means, said means for applying air from said engine to said fuel atomizer means includes means for applying output from said air compressor means to said fuel atomizer means, and means for applying output from said air compressor means to said third valve means.

5. In the combination recited in claim 1 wherein there is included means for purging said catalytic bed with hot exhaust gas before discontinuing the use of said hydrogen product gas generator.

6. In combination, an internal combustion engine, which produces hot exhaust gas when operative, and a hydrogen product gas generator, said internal combustion engine having means for applying an air/fuel mixture to said engine, and means connected to the engine for producing air under pressure, said hydrogen product gas generator including first walls defining a hollow chamber, said chamber having an input end, an output end, and a center portion, a catalytic bed positioned in said center portion, heating wire means in said bed, means for energizing said heating wire means to heat said catalytic bed to its operating temperature and for de-energizing said heating wire means when it has reached its operating temperature, second walls forming a spiral passageway around said first wall, said spiral passageway having an input end and an output end, fuel atomizer means having a fuel input, an atomizing air input, a vaporizing air input and an output, air/fuel mixer means having a first input connected to said fuel atomizer output, a second input adjacent said first input connected to said spiral passageway output end, and an output connecting to said hollow chamber input end, means defining a source of liquid hydrocarbon fuel, first valve means having a first position for applying fuel from said source to said fuel atomizer means fuel input, and a second position for blocking said fuel input, means for applying air from said engine to said fuel atomizer means atomizing air input for atomizing fuel applied to said fuel atomizer means, second valve means having a first position for applying air from said engine to said spiral passageway input end and a second position for terminating the application of air, and third valve means having a first position for connecting said hollow chamber output end to said means for applying an air/fuel mixture to said engine, and a second position for venting the hollow chamber output to the atmosphere whereby following engine start up, and after said catalytic bed has been heated to its operating temperature by said heating wire means, said first, second and third valve means are operated from their second to their first positions whereby the air from said engine is preheated by said catalytic bed vaporizes said atomized fuel and this is applied to said catalytic bed to be converted to a hydrogen rich product gas which is fed to said means for applying an air/fuel mixture to said engine.

7. In the combination recited in claim 6 wherein said means for applying an air/fuel mixture to said engine includes an intake manifold, and said third valve means when in its first position connects said hollow chamber output to said intake manifold.

8. In the combination recited in claim 6 wherein said catalytic bed is a monolithic catalytic bed.

9. In the combination recited in claim 6 wherein there is included:

means for purging said catalytic bed with hot exhaust gas for discontinuing the use of said hydrogen product gas generator.

* * * * *